United States Patent [19]

Chow et al.

[11] Patent Number: 5,642,511

[45] Date of Patent: Jun. 24, 1997

[54] SYSTEM AND METHOD FOR PROVIDING A VISUAL APPLICATION BUILDER FRAMEWORK

[75] Inventors: ChungHen Chow; James William Fountain, Jr.; Rene Lim Llames, all of Austin, Tex.

[73] Assignee: International Business Machines Corporation, Armonk, N.Y.

[21] Appl. No.: 357,834

[22] Filed: Dec. 16, 1994

[51] Int. Cl.⁶ ................................................. G06F 9/45
[52] U.S. Cl. .................... 395/701; 395/967; 395/685
[58] Field of Search .............................. 395/700, 100, 395/701, 961, 967

[56] References Cited

U.S. PATENT DOCUMENTS

| | | | |
|---|---|---|---|
| 4,943,932 | 7/1990 | Lark et al. | 364/513 |
| 5,067,072 | 11/1991 | Talati et al. | 395/650 |
| 5,315,703 | 5/1994 | Matheny et al. | 395/164 |
| 5,315,709 | 5/1994 | Alston, Jr. et al. | 395/600 |
| 5,335,320 | 8/1994 | Iwata et al. | 395/155 |
| 5,339,433 | 8/1994 | Frid-Nielsen | 395/700 |
| 5,487,141 | 1/1996 | Cain et al. | 395/135 |
| 5,537,630 | 7/1996 | Berry et al. | 395/155 |

OTHER PUBLICATIONS

"Visual Script Action Objects", IBM Technical Disclosure Bulletin, vol. 37, No. 04A, Apr. 1994, p. 683.

"Expose Connection List as Property", IBM Technical Disclosure Bulletin, vol. 37, No. 08, Aug. 1994, p. 433.

"Attribute Action Objects", IBM Technical Disclosure Bulletin, vol. 37, No. 02B, Feb. 1994, p. 665.

"PRoxy Definition Tool for Visual Builder", IBM Technical Disclosure Bulletin, vol. 37, No. 04B, Apr. 1994, p. 347.

"User Interface for Scripts in an OO Visual Builder", IBM Technical Disclosure Bulletin, vo. 37, No. 04B, Apr. 1994, p. 449.

"Lock Icon to Secure Visual Builder Controls", IBM Technical Disclosure Bulletin, vol. 37, No. 04B, Apr. 1994, p. 21.

*Primary Examiner*—Kevin A. Kriess
*Assistant Examiner*—Kakali Chaki
*Attorney, Agent, or Firm*—Robert M. Conwell

[57] ABSTRACT

A system and method are provided for implementing an improved visual builder. A proxy tree comprised of proxy objects is visually built. Each proxy object corresponds to a target object in a runtime hierarchical target object tree. Proxy object interfaces, as seen by the user, are decoupled or separately and independently defined from the interfaces of the target objects. Accordingly, arbitrary mapping of proxy properties and operations to IDL attributes and operations is provided for. Visibility and grouping control is also provided to proxy properties and operations whereby the visual builder is not forced to present the exact attributes and operations of the target objects dictated by a given object definition which may be less user-friendly, inappropriate, or unnecessary in a visual builder environment. Provision is further made for the detachment and destruction of the proxy tree after it has realized the corresponding runtime hierarchical target object tree, thereby improving memory consumption at runtime.

24 Claims, 4 Drawing Sheets

BUILD TIME

CREATE/EDIT/BUILD PROXY OBJECT TREE

RUNTIME

TARGET OBJECT
HIERARCHY TREE

BUILD TIME

CREATE/EDIT/BUILD
PROXY OBJECT TREE

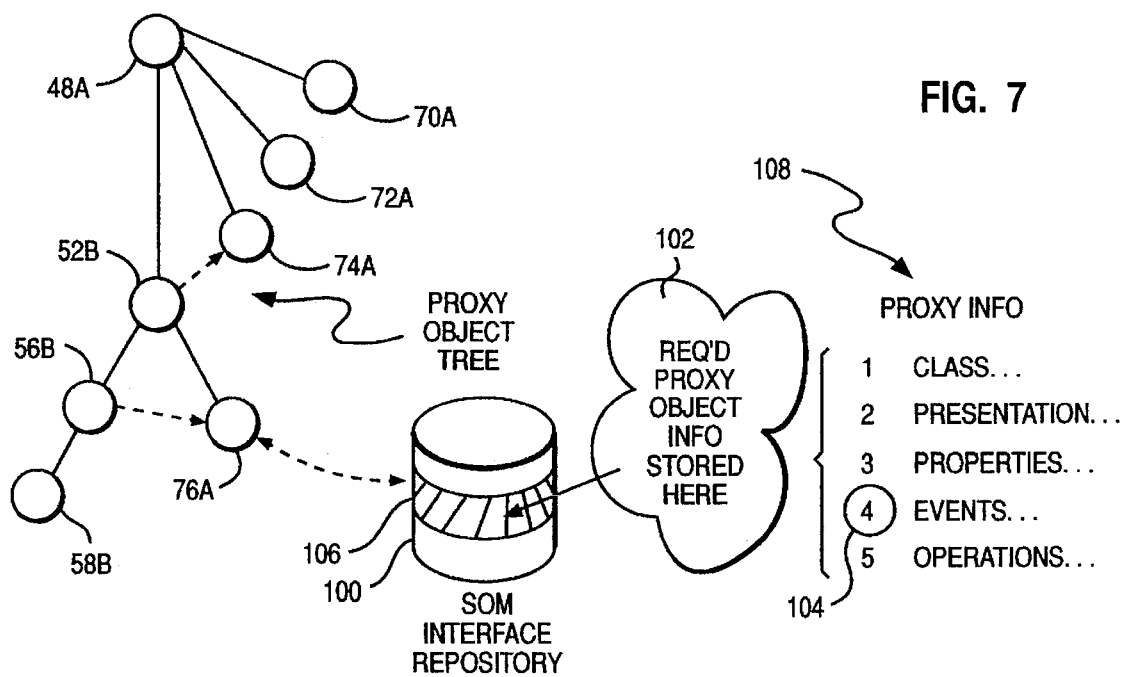
FIG. 7
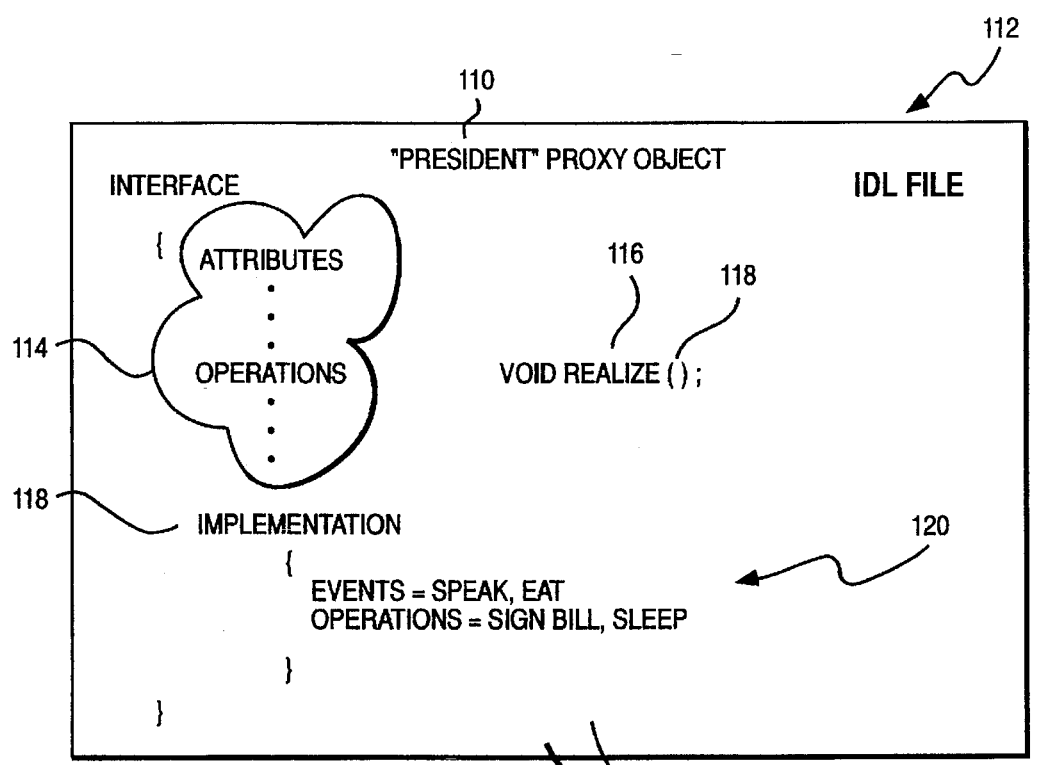
FIG. 8
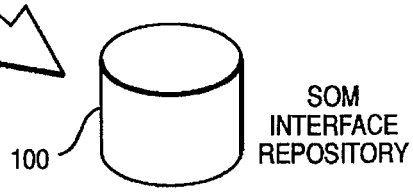

SYSTEM AND METHOD FOR PROVIDING A VISUAL APPLICATION BUILDER FRAMEWORK

CROSS-REFERENCE TO RELATED APPLICATIONS

The present application is related to copending U.S. patent application Ser. No. 357,838 entitled "SYSTEM AND METHOD FOR IMPLEMENTING PROXY OBJECTS IN A VISUAL APPLICATION BUILDER FRAMEWORK", filed on Dec. 16, 1994, which is herein incorporated by reference.

TECHNICAL FIELD

This invention generally relates to computerized object-oriented technology and, in particular, to improving interactive user interface development systems and methods.

BACKGROUND OF THE INVENTION

Prior to the development of object-oriented programming, a form of programming was developed known as structured programming, which is still used extensively. In this technique, various functions are first defined, and the program then consists of calling such defined functions at appropriate times to effect the overall objective of the application program. Structured programming provided the opportunity of a modularized approach—a significant improvement over "spaghetti code" which was difficult to debug and maintain. Nevertheless, several drawbacks to structured programming remain, such as the "semantic gap" between the concepts and entities in the world being modeled by the program and the concepts in the programming language, the textual nature of the program code, and limitations on reusability of code modules.

Eventually, a new programming paradigm was developed, referred to as object-oriented programming. In this technique, instead of defining functions, "objects" are defined (by defining their "class"). Only the external interfaces of the objects and what can be done with the objects are specified for the end-user, as opposed to the internals of they are constructed.

As a simplistic example of this technique of describing the external "appearance" of an object without the necessity of describing what it "looks like" or "does" inside, and in order to illustrate the significant benefits of such object-oriented programming, one might imagine, by analogy, a common household toaster, which could be modeled by the object-oriented approach. The external "interface" would consist of the knob, which essentially represents a parameter for adjusting the desired lightness or darkness of the toast, the slot into which the bread is inserted, and a lever for affecting the insertion and activating the toaster. The important concept is that the end-user of such an appliance does not need to know the "internals" of the toaster in order to use it, e.g. whether heat is provided by electricity, or by chemical or other means. All the user would have to do is interface properly with these externals.

The beauty of this evolution in programming is that, continuing with the analogy, the designer of the object, which might be a module of programming code modeling a toaster, may focus on improving the internals of the toaster, making it more efficient, for example, without affecting the user's ability to use the object, inasmuch as the internals are transparent to the user. Thus, more abstractly, object-oriented technology may be seen essentially as providing the advantage of separation of the interface of an object from it implementation. In a software context, the internals of the object may thereby be rewritten and improved without the necessity of rewriting the entire application program, as long as the external "knobs" etc, and their expected behavior have not changed.

The foregoing illustrates one of two important characteristics of object-oriented technology, namely, that of "encapsulation". The other characteristic is "inheritance", whereby, broadly speaking, an object may "inherit" (or acquire) all or some of its interface or implementation from another similar object, thereby avoiding the need to duplicate the descriptions of such common characteristics. For example, a "WheeledCarrier" class of objects may be defined, having the generic characteristics and definitions of having wheels and being able to carry passengers. A "Car" class of objects can then be defined, which inherits part of its description from "WheeledCarrier". Similarly, an "Airplane" class of objects can also be defined, which inherits from "Wheeled-Carrier". (In object-oriented terminology, the "Car" class is a subclass of the "WheeledCarrier" class, "Airplane" is a subclass of "WheeledCarrier", and "WheeledCarrier" is a superclass of "Car" and of "Airplane". Of course, cars are different from airplanes and their full descriptions will reflect the differences, but because of the use of inheritance, redundant description of their common characteristics of having wheels and being able to carry passengers is avoided.

For further general background regarding object technology to facilitate a better understanding of the invention, reference should be made to "Object Oriented Technology—A Manager's Guide", by David A. Taylor, copyright 1990, Servio Corporation.

With the development of object-oriented programming, several "object models" were further refined and developed, which specified the manner in which one was to define objects and their external interfaces, such various object models providing the aforementioned characteristics of encapsulation and inheritance among others. At an appropriately high level, these various object models are very similar, examples of which are the System Object Model (SOM), Common Lisp Object System (CLOS), Smalltalk, and C++. In essence, these various object models are simply a body of rules answering the question of what an object is, each offering slightly different answers when examined at lower levels. For example, various object models differ in their language syntax, and in how encapsulation and inheritance work.

As a direct result of these differences, one problem presented by the availability of different object-oriented languages and object models was that problems in interlanguage operability appeared, e.g. object programs could not be written with a mixture of such languages, thereby adversely impacting one of the major promises of object technology, namely reusability of code. In an effort to address this problem plaguing the industry, a Common Object Request Broker Architecture (CORBA) was arrived at by committee, which included a standardized Interface Definition Language (IDL). There was in essence an agreement in the industry as to how interfaces of an object would be specified, i.e. a standard for defining object interfaces so that objects defined by one vendor could be utilized by another. Thus, with CORBA, the effort was started to facilitate uniform definitions across languages of what an object was to "look like" in order to facilitate implementation of applications in multiple languages.

The aforementioned System Object Model (SOM) is one object model which conforms to CORBA and IDL. Conformance means that SOM objects follow CORBA semantics, and SOM objects are defined in IDL syntax. The significance of the foregoing will become readily apparent hereinafter in a more detailed description of the invention but is provided at this point for background.

We will now turn more specifically to an application of this object technology, in particular, to problems associated therewith which have plagued the industry and been successfully addressed by the subject invention. One important use of object technology is in implementing an improved "visual builder" environment for visual programming. A visual builder is essentially an application writing tool permitting the "writing" of programs visually (instead of by the more traditional method of writing textual code). Particular utility for such tools arises with respect to the writing of programs having graphical user interfaces ("GUIs"). As will be hereinafter seen, the invention provides such a program-writing tool which is itself visually based as well.

It is a characteristic of current programming technique that a great deal of the time is spent in coding the actual graphical user interface or "GUI" presented to the user (as opposed to the underlying code and functionality to which the GUI interfaces), and the present invention is directed in part to simplifying these tasks. To be more clear as to what is meant by a "visual builder", put simplistically, it is a tool which facilitates the writing of programs by the creation, movement, and interconnection of icons, e.g., through a user interface or GUI as opposed to through conventional textual programming.

A simple example of such a visual builder may be seen in the product "Visual Basic" by Microsoft Corporation in which the user interfaces, such as various windows, pull-down menus, buttons, scroll bars, and the like are created visually. A visual builder system arranges for the actual functioning interface to appear when the built application is executed, thereby relieving the programmer of the task of writing a textual program to implement the interface. As will become more apparent hereinafter, there is an increasing need to facilitate the ability to efficiently program applications visually, e.g. by "visual programmers" who do not have the detailed knowledge of computer programming languages and the like associated with the more traditional notion of a computer programmer. This need has been fueled in part by the phenomenal increase in multimedia. The invention is intended to address in part the problems associated with this concept of visual programming.

A major task of implementing a useful visual builder is to provide the function of a visual editor of the tree or graph structure of FIG. 4 (although as will hereinafter be seen it will necessarily have additional requirements, such as providing the ability to edit properties associated with the objects, etc.).

In order to more fully understand the invention, again, by way of background, a general description of the requirements for such a visual builder will now be provided.

Referring first to FIG. 2, a representative user interface 40 is shown which might appear on the monitor 38 of FIG. 1 during the process of a user visually programming a desired application. The purpose of the interface is to provide a dialog and interface between the computer and the programmer by means of visual items such as sliders, buttons, etc. whereby the programmer may proceed to structure, build, and define an end-user application. The application itself may also include graphical user interfaces employing items similar to those shown in the application build tool screen of FIG. 2, e.g., sliders, buttons, windows and the like.

More specifically, a representative interface 40 might include various icons such as slider bars 42, 46 (with associated slider "thumbs", 43, 49; end buttons 41, 45, 47, 48); buttons 50, 58; icons such as speaker icon 44; windows 52, 56; and pull-down menus 54.

One aspect of the interface 40 of FIG. 2 not intuitively obvious is that although these various items appear "flat", "under the covers" they would reveal an associated nested hierarchy of visual objects such as depicted in FIGS. 3 and 4. Thus, comparing FIGS. 2 and 3, it will be seen for example that button 58, rather than being merely a "flat" arrangement as a control, exhibits a nested relationship whereby button 58 is, hierarchically speaking, in box 56 which is in turn in box 52 and in turn in box 49.

A conventional way in the art to represent a nesting or containment relationship, such as that embodied in a GUI and the corresponding programming code implementing it, is by means of a data structure commonly known as a "tree" or graph shown in FIG. 4, which obviously more readily visually depicts the hierarchy. Each of the icons, slider bars, and the like are shown in FIG. 4 as a node or circle representing an "object" within the meaning of the object-oriented technology hereinbefore described.

In a conventional approach to writing user interface programs, trees similar to FIG. 4 are programmed textually. The various nodes, children to nodes, and children of children to nodes, etc. shown by the objects of FIG. 4 are typically implemented in building up the tree of FIG. 4 by coding in a high level language such as C, C++, or the like. As has already been pointed out, this process is extremely tedious, involving all of drawbacks of even high level languages including statements requiring precise arguments, syntax, semantics and the like.

Because of the foregoing, it became desirable to provide for the aforementioned "visual builders" whereby a program could be constructed which would in essence build the desired runtime trees of FIG. 4 by means of interactively creating, moving, and interconnecting various icons and the like (such as those depicted in FIG. 2) inasmuch as it is far easier to do so by this means rather than by writing C programs, for example.

Thus, in response to this need, vendors set upon the task of providing visual builders to interactively build up these containment structures or trees.

It should be noted that interacting with the various items of FIG. 2 would not necessarily impact the runtime tree of FIG. 4. For example, clicking on button 58 would not necessarily alter the tree structure of FIG. 4. However, moving button 58 out of box 56 to location 60 would change the hierarchical structure of this object, as may be seen in FIG. 4. Object 58A which extended from object 56A (corresponding to button 58 being contained within box 56) would, after the button 58 was moved to location 60, be reflected in the tree as object 60A now extending from object 52A (thereby reflecting the new hierarchy in which button 58 at location 60 is contained by box 52). Thus, in general, it may be seen that manipulating the items in the interface FIG. 2 may alter the corresponding object tree of FIG. 4.

A major task of implementing a useful visual builder is to provide the function of a visual editor of the tree or graph structure of FIG. 4 (although as will hereinafter be seen it will necessarily have additional requirements, such as providing the ability to edit properties associated with the objects, etc.).

Continuing with the general background discussion regarding the requirements of implementing visual builders and user interfaces, textual programming of GUI applications, for example, with the C language and some library such as X and OSF/Motif, or the Presentation Manager library of the OS/2 operating system shows that several further tasks are required beyond the building of the initial tree. The initial properties of the various nodes in the tree must be set, or, in general, the programmer must decide, for each available property, whether to specify its initial value or to accept the default initial value. (Examples of properties of the nodes in the interface of FIG. 2 would be the color of box 49, initial position of a slider thumb 43, contents of a pull-down menu 54, etc.). In addition to the task of setting or defaulting such properties of objects, there is the further task of making connections between the objects, thereby specifying the actions to be performed when certain events occur. For example, if the user were to depress button 50, the desired action might be, for example, a beeping of speaker 44. If the position of slider 43 changed, the desired action might be for some window to scroll appropriately.

Finally, after the tree has been built, the various object properties have been set, and the actions to be performed on specified events have been specified, the last task that a GUI application (either built by a visual builder or textually programmed) must do is to enter an event loop at runtime. If an event occurs, the program will perform the corresponding action, and then wait for occurrence of the next event. The typical desired behavior is for the application program to be running in an infinite event loop, responding to events such as the activation of button 50, etc.

From the foregoing, it will be readily appreciated, in summary, that a user interface application may be represented by a tree such as that of FIG. 4 which in turn represents a hierarchy of objects, and that the construction of such a tree textually is an extremely tedious matter, giving rise to the development of visual builders. However, even with the presence of visual builders, several serious problems nevertheless persisted.

First, these objects themselves (such as those shown at the nodes in FIG. 4), are typically written in accordance with more traditional programming techniques wherein the objects might never have been intended to be manipulated in a visual builder environment, but rather, intended to be part of a low level object-oriented toolkit library. Consequently, usability of these objects for higher level visual programmers may not have been a prime consideration or even a consideration at all in implementing these objects, and accordingly the properties thereof, prior to the invention, might not appear intuitive to a visual programmer.

A problem is that, in present systems, the interfaces of the runtime objects presented to the visual programmer are constrained to be those specified by the object definition. Thus present systems are limited to presenting to the visual programmer exactly the same interface (e.g., Smalltalk methods, CLOS generic functions, and by extension to CORBA, IDL attributes and operations specified by the definition of the object). Such interface may include, for example, unwieldy attribute or operation names, and attributes or operations which are at such a low level as to seriously impair the user friendliness of a visual builder.

SUMMARY OF THE INVENTION

In accordance with the invention, a system and method are provided for implementing an improved visual builder. A technique is disclosed for visually building and editing a proxy tree comprised of a plurality of proxy objects. Each such proxy object in the tree at build time corresponds to a "target" object in a corresponding runtime object tree. The proxy object interfaces, as seen by the user of the visual builder, are decoupled from the interfaces specified by the definition of the target object in whatever object model the target object is defined in.

In particular, in a preferred embodiment, a visual builder is disclosed in the System Object Model (SOM), wherein proxy object interfaces, as seen by the builder user, are decoupled from those specified by the SOM IDL interface of the target object. Accordingly, arbitrary mapping of proxy properties and operations to IDL attributes and operations is provided for. Moreover, as a result of such ability to map proxy objects, visibility and exposure control is provided to proxy properties and operations. In this manner, the improved visual builder of the present invention is not forced to present to the builder user the exact attributes and operations of the target objects dictated by the target object definition, which attributes and operations may be less familiar or intuitive, more complex, or unnecessary in a visual builder environment.

In the preferred embodiment, provision is further made for the detachment and destruction of the proxy tree after it has performed the function of realization at application runtime, whereby the corresponding runtime hierarchical target object tree is constructed. In this manner, memory consumption at runtime is reduced. In particular, upon realization of the target object tree, proxy object code and particularly the dynamic link libraries (DLL) required by the proxy tree may be removed from memory, thereby improving the memory usage.

From the foregoing, it should be readily apparent that an object of the invention was to provide a visual builder wherein the object's interface as seen by a builder user could be decoupled or separately and independently defined from (but of course related to) that specified by the object.

More particularly, it was yet another object of the invention to provide for an arbitrary mapping of more intuitive or appropriate (in a visual builder environment) properties and operations of objects to the attributes and operations of the objects as specified by their IDL definitions.

Still a further object of the invention was to provide for more control of the manner in which editable properties and operations of runtime objects are presented to the visual programmer to avoid overwhelming the visual programmer with unnecessary object detail.

It was a further object of the invention to facilitate the definition of new properties of objects at higher levels of abstraction, which could be presented to the visual programmer, thereby making the editable runtime objects more intuitive.

Yet another object of the invention was to provide an improved visual builder tool which could produce an application that would conserve memory at runtime.

These and other objects have been provided by the invention, a more detailed description of which follows hereinafter and may be more fully understood with the accompanying drawings wherein:

BRIEF DESCRIPTION OF THE DRAWINGS

FIG. 7 illustrates the storage of selected proxy object information in an Interface Repository;

FIG. 8 illustrates an example of a particular form of a proxy object and associated IDL file stored in an Interface Repository as illustrated in the FIG. 7.

DETAILED DESCRIPTION OF THE PREFERRED EMBODIMENT

From the background of the invention, the general benefits to a visual builder or interactive user interface development system should now be readily apparent. Before describing in more detail aspects of the subject invention, additional detail will be provided in relation to the requirements for a visual builder generally.

Figure 4:
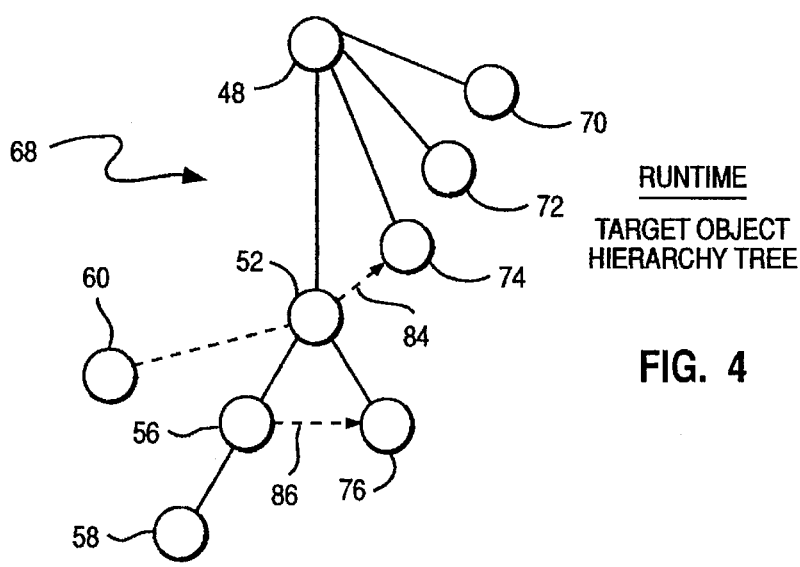
FIG. 4 an illustrative runtime target object hierarchy tree of the invention corresponding to FIG. 3.

As previously described, the first task of such a builder is to perform the function of a tree editor and make building a tree such as that shown in FIG. 4 considerably easier than in the case of writing textual code, which would typically require code to create each node and attach it to the appropriate parent. With the advent of visual builder environments, the visual programmer may simply drag a desired object such as button 58 of FIG. 2 to location 60. Internally, the visual builder code would automatically understand how to alter the corresponding object tree, thereby producing a new tree as shown in FIG. 4.

As touched on in the Background of the Invention, a second task to be provided by a visual builder in accordance with the invention is to facilitate the setting of properties of the runtime objects such as those of FIG. 4, i.e., the visual builder must be a property editor. This means that the builder must provide for the editing of initial properties of objects interactively without the necessity of the programmer writing code. For example, the programmer should be able to click on an object, such as one of the pushbuttons shown in FIG. 2, and be shown a list of properties of that button object in order to set them. Such properties might include the foreground and background color, as an example.

A third function to be performed by a visual editor in accordance with the invention is to facilitate the user's ability to specify actions to be performed. Thus, a connection model will accordingly be provided, an example of which is as follows. The user might desire, for example, upon clicking on the button 50 of FIG. 2 with an appropriate pointing device, that a sound occur such as that represented by the speaker 44. A desirable implementation of a system for specifying actions to be performed, using this example, would enable the user to drag a cursor after clicking on the button 50 to the desired object such as the speaker 44. An arrow 62 might then be presented signifying that an operation will be performed on the target object 44 to be specified. Desirably a dialog box may then appear when editing this connection, shown by arrow 62, to enable the visual programmer to specify the event on button 50 which would cause some specified operation on speaker 44 to be invoked. Possible events which could be associated with the button might be a "click" event, (occurring when the button is pressed), an "expose" event (occurring when the button first appears or when a window covering it is moved), or a "resize" event (occurring when the button is resized, if it is resizable).

Figure 2:
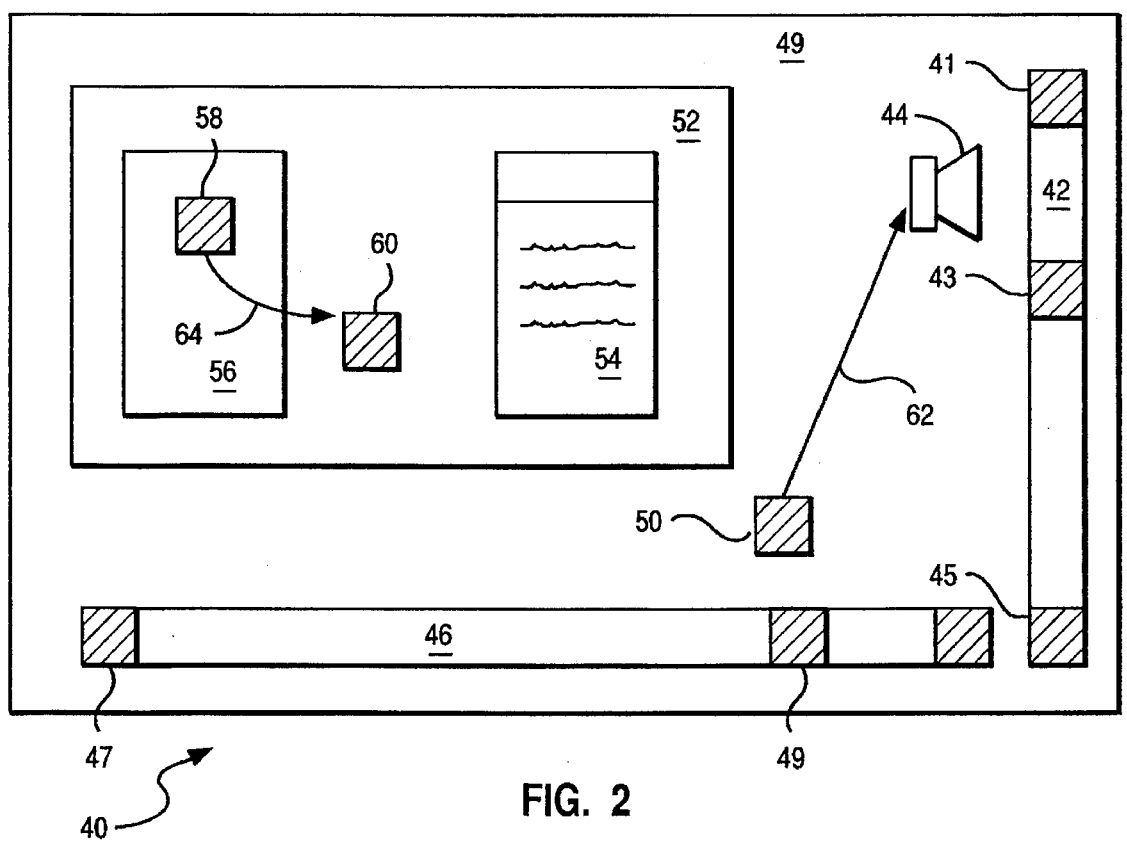
FIG. 2 is an illustration of a graphic user interface portion of a program which may be implemented with the invention.
Figure 3:
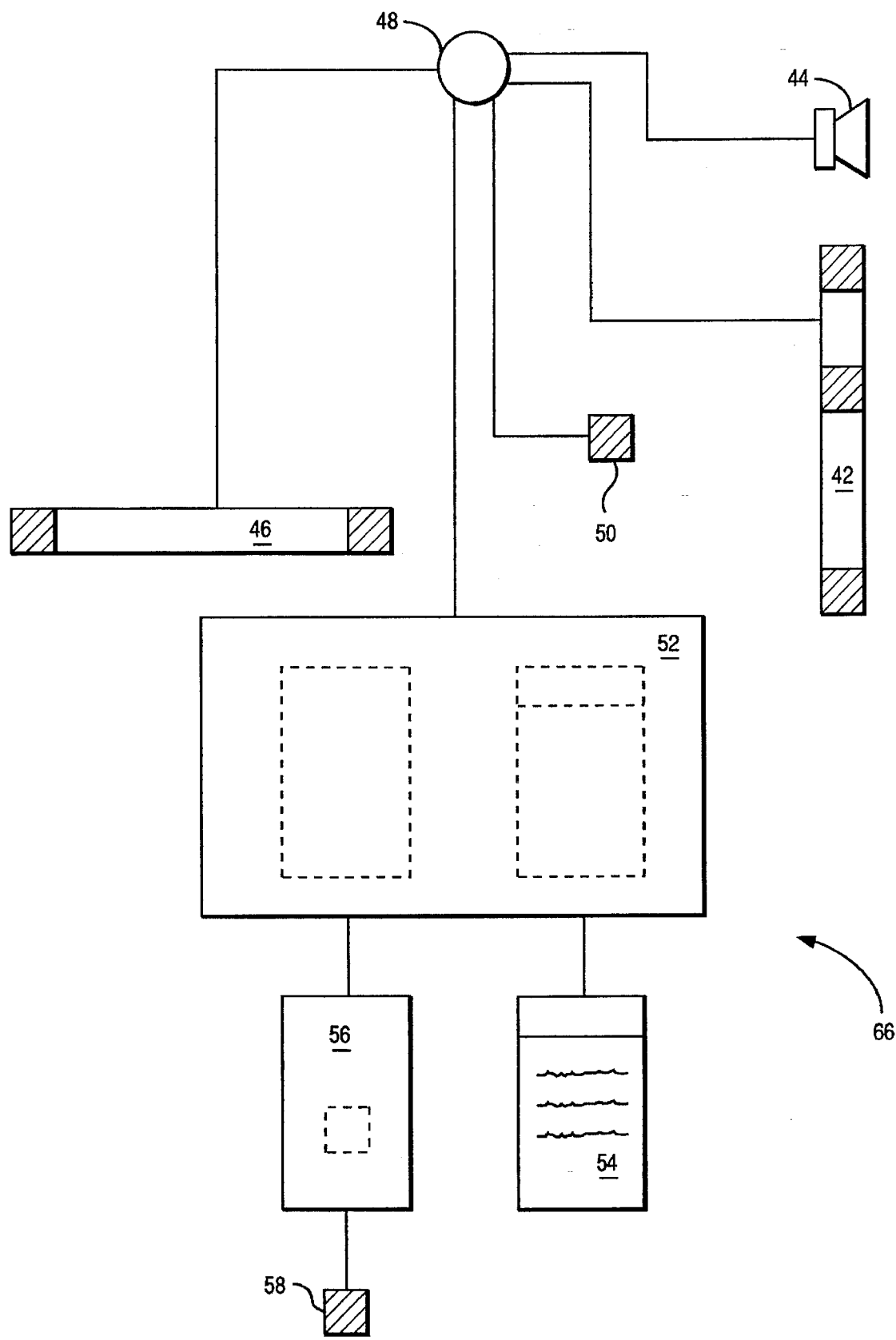
FIG. 3 is an illustration of components of the user interface of FIG. 2 illustrating their hierarchical nature.

As another example of objects having events for which the visual builder must be able to specify actions, consider slider object 42 in FIG. 2. In the case of such a slider, a typical event might be a "changed" event if the position of the thumb 43 or 49 changed, thereby requiring the action of scrolling a window. In like manner, clicking by a pointer device on the end buttons 41, 45, 47, or 48 might, in response to this "click" event, cause scrolling by a page in a window.

From the foregoing, it will be seen that a way may thus be provided for interactively specifying actions to be performed when an event occurs. In summary, then, a desired implementation of a visual builder in accordance with the invention builds an object tree associated with an interface, facilitates setting the properties of the objects, and then further facilitates specifying the actions to be performed when certain events occur.

Detail will now be provided of how a particular visual builder framework in accordance with the present invention operates.

It will be noted that FIG. 4 is labelled a "Runtime Target Object Hierarchy Tree". Nodes shown in the Figure such as 72, are representations of actual objects which are desired to be created when the end-user application executes. At realization, an application built with the visual builder of the invention will, at runtime, create such a "runtime" object tree of FIG. 4. Secondly, it will be recalled that the various properties of the nodes or target objects shown in FIG. 4 will be set, and finally all of the linkages such as those shown by arrows 84 will be effected (specifying that if an event occurs on a given object, this will in turn call an operation of another (possibly several) object). FIG. 4 is thus labelled "Runtime" because it illustrates the objects which the application must create when it runs.

It is important to make a distinction between this runtime and "build time" during which the visual builder is not actually creating the objects of FIG. 4. It is an important feature of the invention that "proxy" objects are created by the visual builder during this "build time" (shown in FIG. 5), and that these editable proxy "source" objects map to corresponding runtime "target" objects shown in FIG. 4.

Figure 5:
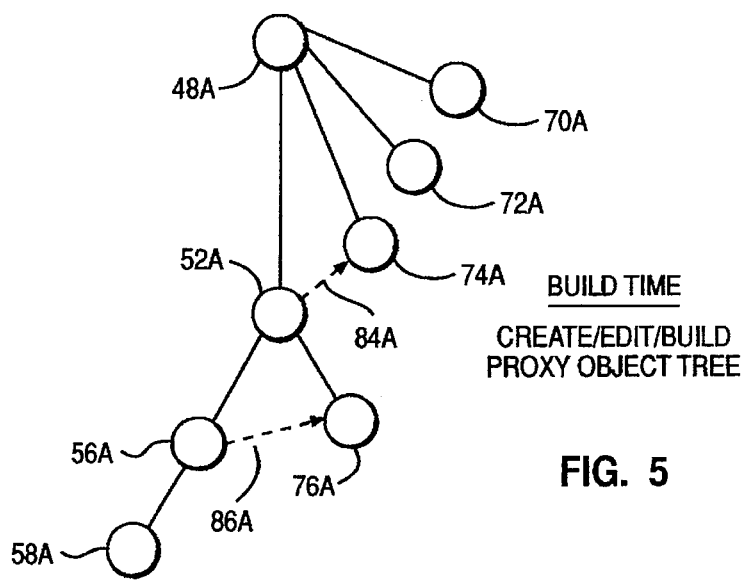
FIG. 5 is a create/edit/build proxy object tree in accordance with the invention corresponding to the tree of FIG. 4.

By analogy, in standard textual programming, at "build time", when an end-user application is being written, the programmer is editing source code text which is not (usually) the actual executable form of the program. Thus, in the case of the visual builder of the invention, the visual builder, in part, may be thought of as a "source code" editor performing a function similar to the text-based source code editor in the more conventional process of editing in standard textual programming. The distinction is that the "source" being edited by the visual builder is not a stream of ASCII text characters, but rather a tree of these "proxy" objects, as shown in FIG. 5.

Whereas at runtime (FIG. 4), the goal is for the visual builder to build the tree of "target objects", at build time (FIG. 5) it is desirable for the visual builder to create, edit, and build a tree of corresponding proxy objects. A comparison of FIG. 4 and 5 will reveal a similar pattern between the target objects and proxy objects visually illustrating their one-to-one correspondence and the similarity in structure between the proxy object tree and the target object tree.

Thus, the visual builder of the invention may be seen in reality to be, in part, a proxy tree or graph editor, with the proxy objects being the "source" which is manipulated and edited by the visual programmer at build time. The reason why a proxy tree of FIG. 5 is required is that the proxy objects differ from the target objects in important respects which will be hereinafter detailed.

As previously described, each of the target objects shown in FIG. 4 (70, 72, etc.) represent the final actual runtime objects which are desired to be built, such as the scroll bar, window, form, etc., objects. Although the examples discussed have focused on visual runtime objects, note that runtime objects may also be nonvisual, e.g., they may not necessarily have a visible representation at runtime. In contrast, the objects represented by the circles or nodes in FIG. 5 are "stand-in" or "proxy" objects (which may also be thought of variously as "surrogate" or "shadow" objects) in the sense that each one has a corresponding target object at runtime. This explains the numbering convention of "70" for the target object and "70A" for the proxy object, as an example.

Now that the notion of a "proxy" object has been introduced as a fundamental concept of the present invention, it is necessary to detail the functions it must be capable of performing. They are as follows:

REPRESENTATIVE PROXY FUNCTIONS

1. Present itself at build time.
2. Provide storage for, and access to, property values.
3. Provide information on the events available on corresponding target object.
4. Provide information on the operations available on corresponding target object.
5. Save itself on, and restore itself from, a persistent medium.
6. Copy itself.
7. Realize itself, and subsequently detach itself from the realized target object tree, and destroy itself.

Figure 1:
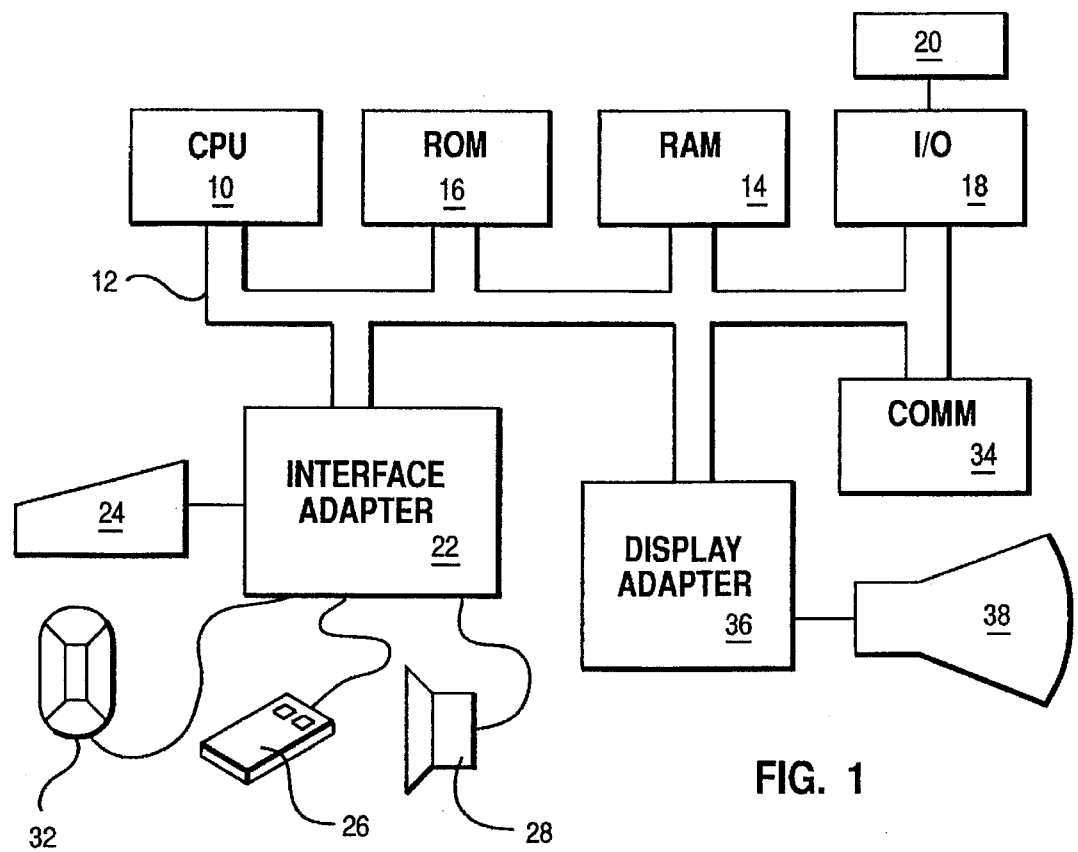
FIG. 1 is a block diagram of a personal computer system for use in implementing the subject invention.

As to the first function of all such proxy objects, e.g., presenting itself at build time, this means that each proxy object must be able to display on the appropriate monitor 38 of FIG. 1, a visual manifestation of itself to enable interactive manipulation. Thus, as an illustration, a function of the proxy object for a button 58 of FIG. 2 must be to present a visual image in a user interface so as to suggest to tile visual programmer that there exists a button target object in the target object tree being built.

Regarding function 2 of proxy objects, it will be recalled from the foregoing that a visual builder of the invention serves as a property editor, i.e., it provides the facility for editing the various properties of proxy objects. Accordingly, it should be evident that it is necessary to provide some facility for keeping track of these properties, e.g., what names and current values are. As an example, a pushbutton target object and corresponding proxy object might have, as properties, the foreground and background colors thereof, height, width of the button, and the position of the upper-left corner thereof. A corresponding proxy object would therefore store this property information associated with the target button object. In other words, the button proxy object, as an example, will "know", (i.e., be capable of storing and accessing) the aforementioned properties and what their current values.

Regarding functions 3 and 4 of the proxy objects, if the visual builder of the invention is going to include the facility of making interconnections between proxy objects, there must be facility for knowing the events and operations which are available. For example, if proxy object 74A corresponds to a pushbutton target object 74, then an additional function of the proxy object 74A is to have information on the events which can occur on it, such as the "click" event. In other words, the proxy object must know the events available so that the programmer may select the appropriate one to which to attach a desired action. Actions are usually invocations of operations on other objects. Therefore, a proxy object must have information on the operations supported by its corresponding target object so that the programmer may select and properly call the appropriate one in response to an event. For example, if it is desired to call an operation on the "speaker" object, then the speaker proxy object should know that its corresponding target object supports a "beep" operation.

Regarding function 5 of proxy objects, in the course of visual programming of an application, it may be desirable to suspend creation of the program. This proxy object function simply means that each proxy object must be able to save its corresponding proxy tree information and associated data. In other words, proxy objects must be provided with the ability to save themselves to, and later restore themselves from, some persistent medium such as a file system when visual programming of the particular application is resumed. This function is analogous to the ability of most text editors to save and later resume editing of textual source code.

Regarding function 6 of proxy objects, such proxy objects must be capable of replicating themselves. This facility is required for convenience in visual programming, i.e. to make it possible to create copies of objects at build time.

Finally, function 7 of proxy objects means that proxy objects be capable of realizing themselves, and subsequently detaching themselves from the realized target object tree, and destroying themselves. Proxy objects may be thought of as "delegates" which essentially are standing-in for their corresponding target objects. At some point, it will be desired to execute the program being built, and it will therefore be necessary to create and initialize the runtime tree, such as the example tree shown in FIG. 4. The collection of proxy objects has the necessary information to effect the running of the program inasmuch as it is essentially the "blueprint" or "source code" (FIG. 5) for the corresponding application (FIG. 4). The term "realize" simply means that the proxy objects must be capable of creating their associated target objects.

There are numerous benefits to providing a visual builder of proxy objects and the proxy object tree of FIG. 5 which may not be readily apparent and will thus be hereinafter described in greater detail. The description of these benefits will, in turn, further dictate the manner in which such proxy objects and the corresponding visual builder will be implemented in accordance with the invention.

A first major benefit of the visual builder implementation currently being described, which provides a significant distinction over visual builders of the prior art, is that by provision of such proxy objects, the proxy objects' interfaces as seen by the visual builder user are thereby decoupled from the interface specified by the target object definition.

The target objects of FIG. 4 are defined in a particular object model such as SOM, in the case of the implementation of the invention being presently described. As such, these target objects have an IDL definition which define what the attributes and operations of the particular target object are.

Because, in constructing the visual builder, it has been implemented so that the various proxy objects may be pre-defined and customized, the invention's system is not forced to present to the user of the visual builder the exact attributes and operations of the target objects of FIG. 4. Rather, the flexibility to define a different set is provided.

An example of the foregoing will be helpful in understanding its significance. Operations associated with a target object such as object 72 of FIG. 4, as dictated by the IDL, may be extremely low level. In like manner, attributes of such target objects 72 may have long and rather difficult names to read. Because the invention provides the facility for proxy objects, a different set of properties may be presented to the visual programmer which map to corresponding attributes on the target object. As an example, let us suppose that target object 72 has these attributes, namely "red", "green", and "blue", which are components of an RGB specification of the color of some part of the object on the screen. (Each component controls the amount of the associated primary color.)

At the visual builder level, it is undesirable to present to the visual programmer the information that this particular target object has three properties of "red", "green", and "blue". It would be much more desirable to simply communicate to the programmer that object 72 has a "color" property whose values may take on those listed such as pink, purple, orange, etc. These colors would then be translated into the necessary R, G, B components which the IDL attributes provide in order to effect the desired color.

In other words, a given target object might not provide a "color" attribute in its interface definition. Rather, it may have three separate attributes which collectively make up the color (e.g., R, G, B). To a visual programmer, this may appear as an unduly low level way in which he or she is required to specify color. It would be much more preferable to only require the visual programmer to pick the particular desired color such as orange, rather than doing so by way of specifying 100% red, 50% green, and 0% blue.

Thus, in providing for proxy objects, the invention allows a single property like "color" to be defined and presented to the programmer, and the proxy object possesses the information to translate this user-specified "orange" color value into the attributes of the target object, namely 100% red, 50% green, and 0% blue. For relatively high level users, the invention has facilitated the ability to define new object properties which will then be translated (transparently to the user) into the necessary target attributes. The attributes of the target objects can therefore be rendered more intuitive to the visual programmer by means of such proxy objects.

Stated another way, proxy objects provide a mechanism for introducing abstraction in an object's properties and for mapping the abstractions onto the actual defined interface. If we thus were to define a button's "color" property in the corresponding button proxy object, this proxy object will contain the information necessary to know how to set the corresponding appropriate R, G, and B IDL attributes in the target object the high level "color" property. As will be hereinafter made clearer, the knowledge of how to map the high level proxy object properties to the target object attributes will be utilized at build time and at realization time, and the knowledge is built into the particular proxy object when it is designed.

The invention need not be limited to only mapping properties of proxy objects to one or more attributes (such as IDL attributes in the implementation being described). The invention specifically contemplates mapping properties of proxy objects additionally to arbitrary combinations of properties and operations.

As an example, continuing with the prior illustration, it may be desirable to specify a "color" with R, G and B components. A target object may not have not three IDL attributes R, G, B, but instead may have three IDL operations such as "setR", "setG", and "setB". We may further desire that the builder user again simply be required to set a property "color". In this case, the proxy object would contain the necessary information to translate this "color" into calls to the three operations "setR", "setG", and "setB". This is thus an example of a proxy object property such as "color", being mapped to several operations, rather than an attribute. Note that an "operation" on an object is something which is performed or invoked on an object, as distinct from an "attribute", which is data which may be set or queried, such as "color" or "speed". However, in most object models, including SOM, attributes are just a special case of operations.

From the foregoing, it should be clear that providing the ability to define proxy objects enables us to change the way an object looks to a user, and to not be constrained by the available interface of the runtime target object.

We could, in designing a proxy object for a particular target object, add, remove, or redefine properties of the target object, as long as the new set of properties can be mapped to the existing available attributes and operations.

There is yet another important benefit to having proxy objects. Specifically, provision for proxy objects facilitates the implementation of visibility or "exposure" control on properties and operations of proxy objects.

Typically a visual programmer may not desire to be overwhelmed with the need to view all available editable properties or callable operations of a runtime target object. Provision for proxy objects enables us in the design of the visual builder to present these properties or operations to a visual programmer in a more organized manner. They may be classified into related groups, and a user may be required to take an affirmative step such as clicking on a button to see the properties in a given group. This is what is meant by visibility or exposure control. The user may initially only be shown those properties which are most typically desired to be edited or selected. The proxy objects provide the mechanism to control what properties are seen and editable by a visual builder user at any time.

A point of clarification regarding terminology may be appropriate in order to avoid confusion. At some appropriately high level, the terms "property", "attribute", "characteristic", and "feature" are synonymous and may be used interchangeably. However, as a matter of convention, we use the terms "attribute" and "operation" when referring to the IDL-defined interface of a target object, and the terms "property" and "operation" when referring to the proxy-defined interface, as seen by a visual programmer.

As was explained in the Background of the Invention, if the implementer of a visual builder could control the design of the target objects and their specifications, there might not be a need for redefining the set of properties seen by a visual programmer, or for controlling their visibility. However, in practice, such ability is not present because typically the target objects are already pre-written, often by another programmer under the constraints of a different usage model.

The proxy object framework affords the visual builder implementer (or perhaps more correctly, the person enabling a given object to be used and manipulated within the visual builder), the flexibility to essentially define a new "world" to suit desired purposes and needs. Typically, one of the most important of these needs is that the visual builder be user friendly and, secondarily, exhibit desirable performance characteristics. This flexibility is provided so long as we have the facility for translating the proxy object world to the target object world. The properties of particular proxy objects which are visible to a builder user do not have to be identical to the target object IDL attributes. On the contrary, we thus have the flexibility to define a different set of properties for purposes of user friendliness, for example, so long as we can map the "virtual" properties presented by the proxy objects to the target properties.

It will be noted that the invention is not limited to the mapping of properties. We may also redefine the set of object operations as seen from within the visual builder environment. The operations seen by the visual programmer need not be identical to the operations supported by the corresponding target object. As in the case with proxy object properties, we can relax the requirement that all target object operations be shown as proxy object operations. In other words, the proxy objects may advertise a different set of operations, again as long as we provide facility for translating the new operations to the attributes and operations of the target objects. The earlier comments on visibility control of properties also apply to the operations seen by the visual programmer when specifying event-action connections between objects.

Another important aspect and advantage provided by the invention, in implementing the visual builder and proxy framework as herein described, is the detachment and destruction of the proxy tree after it has performed realization at built application runtime, thereby saving memory consumption.

To explain this feature, recall that important functions of proxy objects is that they must be capable of "realizing" themselves, i.e. creating their corresponding runtime target objects. AT application runtime, the proxy tree of FIG. 5 facilitates the building of the corresponding target object tree of FIG. 4, sets the properties of the target objects based upon the proxy object properties (since proxy objects contain all of the mapping knowledge necessary to set the attributes and call the appropriate operations on the target objects), and establishes the connections indicating, for example, that when event "E" occurs on object "X", operation "P" is to be called on object "Y", etc.

At this point, the necessary runtime object tree of FIG. 4 now exists and is read to "go", i.e., control can now enter the event loop previously described. Because the proxy tree (which, it may be recalled, may be thought of as "source" code) has performed its job and created its image, there is no more need for it to be consuming memory. Accordingly, it is a further feature of the invention to provide for the detaching and destroying of the proxy objects in real memory after they have effected the realization, at runtime, of the target object tree of FIG. 4.

Figure 6:
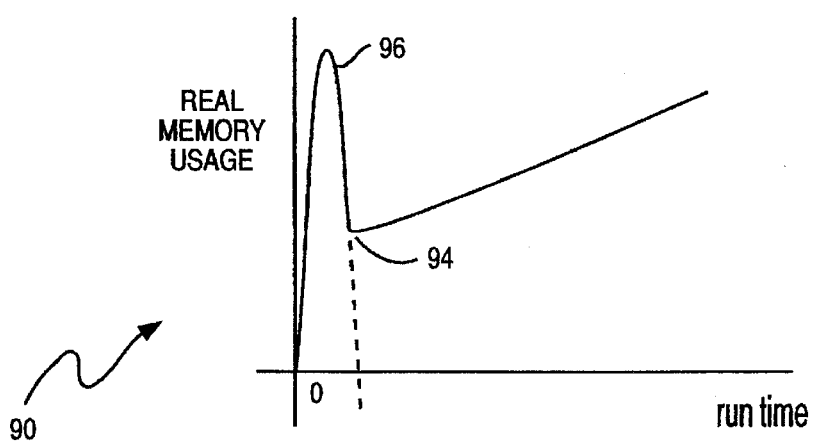
FIG. 6 is a graph illustrating improvements in real memory usage in accordance with the invention.

Referring now to FIG. 6, during the first few moments of application runtime execution, the proxy tree (FIG. 5), is created in real memory and is needed in order to build the runtime tree of FIG. 4. However, after all target objects are built, and the appropriate attributes are set and operations called to initialize the objects' state, and the event-action connections are established, the proxy objects may be removed from memory. The graph 90 represents real memory usage of a system such as that of FIG. 1 wherein the invention is implemented. An initial spike 96 shown therein is caused by the loading of dynamic link libraries (DLLs) associated with the proxy objects into real memory and the restoration of the proxy tree at the beginning of application execution. These DLLs contain the code associated with methods of all the proxy objects. The dip after the spike at point 94 suggests the significant drop in memory usage corresponding to the destruction of the proxy object tree of FIG. 5 and the unloading of such DLLs of the proxy object tree after construction of the target object tree. In other words, the spike 96 is caused in large part by the DLLs of proxy-related code loaded in real memory as well as the proxy object tree. Upon unloading of the DLLs and destruction of the data structures of the proxy tree, which is no longer required, real memory usage drops significantly as shown at reference numeral 94.

It will be recalled that seven functions were enumerated which must be performed by proxy objects. A related consideration is what information these proxy objects must contain to carry out their functions. The information may be categorized as follows:

1. The class of the target object corresponding to the proxy object.
2. Presentation information.
3. Properties and how they are mapped to IDL attributes and operations.
4. Events available on the target object.
5. Operations supported by the target object.

More specific detail will now be provided as to these items of information which proxy objects must contain.

As to the class of the target object, if, as an example, a proxy object is a representative or "proxy" for a "President" object (i.e., the class of the target object is the "President" class), the proxy object, at realization, must "know" that it must create a "president" target object corresponding to itself (the "president" proxy object).

As to the second category of information which the proxy object must contain, recall that one function of the proxy object is to present itself (i.e., display something on the screen) at build time. Therefore, a proxy object must contain the information necessary to effect this presentation. The proxy object must know what object to display to the user, and if, for example, the user has iconified an object, what icon to display.

As to the third item of information contained by proxy objects, e.g., "properties", this refers to the fact that proxy objects must know the properties which can be edited since, at build time, the visual builder user will be editing such properties. The proxy object needs to know the name of each property, the data type of property (e.g., integer, Boolean, string, etc.), the current value, and information relating to visibility control. It will be recalled that it is a feature that not all properties need be exposed to the user, and that differing levels of property or operation disclosure or grouping may be implemented. The proxy object must also include knowledge on how the properties are mapped to the IDL attributes and operations.

Fourth, the proxy object must contain information regarding events available on the target object. Using the "President" example, if a proxy object represents a "President" target object, the proxy object must know the available "events" of the target object. For example, the proxy object must know that the "President" target object has a "speak" event available.

Finally, proxy objects must contain information indicating the operations the target object supports including information on the operation name, arguments, and return values, and how they are mapped to IDL attributes and operations.

One problem in implementing a visual builder, given the need of the proxy objects to contain the aforementioned information, is how to efficiently and effectively store and access this information.

One approach is to hardcode in the (class of the) proxy object all information listed above for each class of proxy object.

An advantage to hardcoding this proxy object information is the performance benefit which is typically associated with hardcoding. However, a significant disadvantage is the lack of flexibility also typically associated with hardcoding, namely, that changes require altering the source code and recompiling, with all of the attendant drawbacks. As an example, if in the "President" proxy object it was hardcoded that the only available event was "speak", and later it was desired to add the event "eat", this would necessitate changing and recompiling the source code of the President proxy object.

Accordingly, it a feature of the invention to provide a list of events stored elsewhere and merely looked up by the proxy object. Instead of a proxy object hardcoding all of the information hereinabove listed, it is sufficient for a proxy object to know how and from where to retrieve the information. By doing so, there is no requirement to alter the proxy object code, but rather to simply alter the list of events, which is maintained separately from the proxy object code.

In general, the approach adopted by the invention is one in which some or all of the information required for a proxy object is embedded in the IDL definition of the (class of the) proxy object, which definition then appears in, and is accessible from, an Interface Repository to be hereinafter described. The knowledge of how to retrieve this information from the Interface Repository is hardcoded (in the proxy object class object).

FIG. 7, provides an illustration of the foregoing concept. An example proxy object tree such as that in FIG. 5 is shown. Also shown is a SOM Interface Repository 100. The list of events available on a particular target object is stored in the Interface Repository 100. The proxy object 76 A for a particular target object knows how to retrieve this list from the Interface Repository 100, rather than storing this information directly. In this manner, should it be necessary to alter the list of events, this may be done by simply editing the portion 106 of the Interface Repository 100 containing the list, thereby avoiding the need to recompile the proxy object code.

In general, rather than hardcoding all of the information 108 required by the proxy objects as shown by the legend 102 for each proxy object, part of this information 108 is stored as desired elsewhere in an Interface Repository 100 which may be more easily changed without the need to recompile. The information or knowledge required by the various proxy objects to locate the information in the repository 100 is what is hardcoded into the proxy objects. It will be noted that repository 100 is simply an information store which may be implemented in several ways, such as through a file system.

Considerations well known in the art will determine, for a given implementation, which of the hereinbefore listed items of information required by proxy objects will be hardcoded in the proxy objects and which will preferably be stored in the Interface Repository 100. In the specific implementation being described herein, all items of information 1-5 shown at reference numeral 108 in FIG. 7 would be provided in the repository 100 with the exception of mapping knowledge properties and operations. At one extreme, all such information could be hardcoded into the proxy object, and at the other extreme, a great deal of information could be stored in the Interface Repository 100. In the latter case, this may necessitate development of a language processor or parser. Thus, it may be readily seen that tradeoffs well known in the art present themselves regarding the decision of hardcoding versus development of sophisticated language processors. Put simplistically, in the implementation under discussion, items of information for proxy objects were placed in the Interface Repository 100 which could be represented as lists which could be easily processed, whereas other items which could be more easily hardcoded were placed in the proxy objects.

It should be pointed out that although storage in the Interface Repository 100 provides the advantage of avoidance of recompilation, for example, one disadvantage of storing a large amount of proxy object information relates to performance, e.g., I/O limitations to bulk storage devices such as DASD or the like, which would be a conventional way to implement the Interface Repository 100.

More detail will now be provided regarding specifics of how the appropriate proxy object information is stored in the Interface Repository, with a specific instance of the technique in accordance with the invention discussed with reference to FIG. 8. The technique of the invention employs SOM IDL modifiers which are the mechanism used to store information in the repository 100. Such a modifier is another syntax in SOM class definition.

FIG. 8, depicts a representative IDL file 112, wherein a "President_Proxy" object class 110 is defined. In this example, the interface definition is in accordance with the IDL syntax previously described. Shown in the file 112 are the attributes and operations 114 of "President Proxy" objects. It will be recalled that defining an object in IDL syntax requires such attributes and operations 114 as mandated by CORBA.

It will be recalled that while SOM is IDL compliant, it goes beyond the requirements of IDL and CORBA in defining additional semantics and syntax. SOM provides for an implementation statement 118 within an interface declaration, which in turn can include arbitrary modifiers 120 such as the "events" and "operations" modifiers shown therein. The basic idea and rationale for such modifiers 120 in SOM is that it is not possible to foresee all possible things which may be desired to be declared about a class. Thus, rather than restricting SOM IDL syntax to include only a limited set of forms, an "escape valve" was provided in the form of these modifiers 120 which are ignored by the SOM compiler. However, the modifiers 120 are stored in the SOM Interface Repository 100 by the SOM compiler, and thereby made available for access by any program, even though the SOM compiler itself does not know how to utilize the information.

It should be apparent that "lists" of proxy object information which are desired to be stored in the Interface Repository 100, in light of the discussion of modifiers, may be placed in an IDL file 112 as modifiers 120. The SOM compiler, as part of the compilation process, places interface definitions (including the modifier information 120) in the Interface Repository 100, so as to be available to any program knowing how to access the repository 100 (which, of course, would include code effecting the access and retrieval by the appropriate proxy objects of the object's information).

While the invention has been shown and described with reference to particular embodiments thereof, it will be understood by those skilled in the art that the foregoing and other changes in form and detail may be made therein without departing from the spirit and scope of the invention.

We claim:

1. A method for use in a computer to build during buildtime executable program code utilizable by an end user during execution at runtime, comprising the steps of:

generating a proxy object tree during said buildtime comprised of non-runtime proxy objects for creating visible runtime objects visible by said end user at said runtime, said tree being maintained with non-visible pointers tracking relationships between said proxy objects including visual containment for visual runtime objects;

editing said proxy tree by visually manipulating representations of said proxy objects, said representations and said proxy objects being perceptible and unperceptible by said end user during said runtime, respectively, and said visual manipulating including storing programming information in said proxy objects for use in said creating visible runtime objects; and generating automatically a target object tree during said runtime comprised of target objects corresponding to any programmable said runtime object from said proxy object tree.

2. The method of claim 1 wherein said generating said proxy object tree is at build time.

3. The method of claim 1 wherein said proxy objects are system object model-based.

4. The method of claim 1 further including the step of executing said executable code in functional response to said target object tree.

5. The method of claim 4 wherein prior to said executing said proxy objects are detached and erased from said computer.

6. The method of claim 1 wherein said target objects are decoupled from said proxy objects.

7. The method of claim 6 wherein properties of said proxy objects are mapped to object model-specific attributes and operations of corresponding said target objects.

8. The method of claim 7 wherein said attributes and operations are IDL attributes and IDL operations.

9. The method of claim 6 wherein operations of said proxy objects are mapped to object model-specific attributes and operations of corresponding said target objects.

10. The method of claim 9 wherein said attributes and operations are IDL attributes and IDL operations.

11. The method of claim 1 wherein each of said proxy objects corresponds to a respective one of said target objects.

12. The method of claim 1 wherein said editing said proxy object tree automatically alters said target object tree.

13. A system for use in a computer to build during buildtime executable program code utilizable by an end user during execution at runtime, comprising:

means for generating a proxy object tree during said buildtime comprised of non-runtime proxy objects for creating visible runtime objects visible by said end user at said runtime, said tree being maintained with non-visible pointers tracking relationships between said proxy objects including visual containment for visual runtime objects;

means for editing said proxy tree by visually manipulating representations of said proxy objects, said representations and said proxy objects being perceptible and unperceptible by said end user during said runtime, respectively, and said means for editing including means for storing programming information in said proxy objects for use in said creating visible runtime objects; and means for generating automatically a target object tree during said runtime comprised of target objects corresponding to any programmable said runtime object from said proxy object tree.

14. The system of claim 13 wherein said means for generating said proxy object tree generates at build time.

15. The system of claim 13 wherein said proxy objects are system object model-based.

16. The system of claim 13 further including means for executing said executable code in functional response to said target object tree.

17. The system of claim 16 wherein prior to said means for executing, said proxy objects are detached and erased from said computer.

18. The system of claim 13 wherein said target objects are decoupled from said proxy objects.

19. The system of claim 18 wherein properties of said proxy objects are mapped to object model-specific attributes and operations of corresponding said target objects.

20. The system of claim 19 wherein said attributes and operations are IDL attributes and IDL operations.

21. The system of claim 18 wherein operations of said proxy objects are mapped to object model-specific attributes and operations of corresponding said target objects.

22. The system of claim 21 wherein said attributes and operations are IDL attributes and IDL operations.

23. The system of claim 13 wherein each of said proxy objects corresponds to a respective one of said target objects.

24. The system of claim 13 wherein said means for editing said proxy object tree automatically alters said target object tree.

\* \* \* \* \*